US012767837B2

(12) United States Patent
Lin et al.

(10) Patent No.: US 12,767,837 B2
(45) Date of Patent: Oct. 20, 2026

(54) METHOD FOR PREPARING CONDUCTOR MATERIAL WITH LARGE SURFACE AREA AND THE STRUCTURE THEREOF

(71) Applicant: Talent Hub Investment Company, Taichung City (TW)

(72) Inventors: Ting-Keng Lin, Taipei City (TW); Chih-Wen Wu, Taichung City (TW)

(73) Assignee: TALENT HUB INVESTMENT COMPANY, Taichung City (TW)

( * ) Notice: Subject to any disclaimer, the term of this patent is extended or adjusted under 35 U.S.C. 154(b) by 305 days.

(21) Appl. No.: 18/512,084

(22) Filed: Nov. 17, 2023

(65) Prior Publication Data

US 2025/0066622 A1 Feb. 27, 2025

(30) Foreign Application Priority Data

Aug. 25, 2023 (TW) ................................ 112132092

(51) Int. Cl.

| | |
|---|---|
| ***C09D 5/24*** | (2006.01) |
| ***C09D 1/00*** | (2006.01) |
| ***C09D 5/28*** | (2006.01) |
| ***C09D 7/20*** | (2018.01) |
| ***C09D 7/40*** | (2018.01) |
| ***C09D 7/61*** | (2018.01) |
| ***C09D 129/14*** | (2006.01) |

(52) U.S. Cl.

CPC ................ *C09D 5/24* (2013.01); *C09D 1/00* (2013.01); *C09D 5/28* (2013.01); *C09D 7/20* (2018.01); *C09D 7/61* (2018.01); *C09D 7/70* (2018.01); *C09D 129/14* (2013.01)

(58) Field of Classification Search

CPC ... C09D 5/24; C09D 1/00; C09D 5/28; C09D 7/20; C09D 7/61; C09D 7/70; C09D 129/14; C08K 3/08; C08K 2003/2206; C08K 2003/2237; H01G 11/86; H01G 11/24; H01G 11/36; H01G 11/38; H01G 11/48; H01G 11/50

See application file for complete search history.

(56) References Cited

FOREIGN PATENT DOCUMENTS

CN 106381577 A 2/2017
CN 106633142 A 5/2017
(Continued)

OTHER PUBLICATIONS

Machine Translation, JP-2017183438-A (Year: 2017).*
(Continued)

*Primary Examiner* — Michael G Miller
(74) *Attorney, Agent, or Firm* — WPAT, PC

(57) ABSTRACT

The present invention provides a method for preparing conductor material with large surface area, which comprises steps of: forming a block layer on the outer surface of a support precursor (for example, a conductive nanometer fiber) for producing a mixed precursor; rolling the mixed precursor to crack a portion of the outer surface of the block layer for producing a plurality of crack-gaps and exposing a portion of the outer surface of the support precursor from the plurality of crack-gaps; and adding a conductor material to the mixed precursor so that the conductor material contacts and is connected electrically to the support precursor via the plurality of crack-gaps for producing a conductor material with large surface area.

18 Claims, 8 Drawing Sheets

(56) References Cited

FOREIGN PATENT DOCUMENTS

| | | | | |
|---|---|---|---|---|
| CN | 107033502 | A | | 8/2017 |
| CN | 109545549 | A | | 3/2019 |
| CN | 111129394 | A | | 5/2020 |
| CN | 114507365 | A | | 5/2022 |
| JP | 2015519742 | | | 7/2015 |
| JP | 2017183438 | | | 10/2017 |
| JP | 2017183438 | A | * | 10/2017 |
| TW | 201906917 | A | | 2/2019 |

OTHER PUBLICATIONS

Japan Patent Office "Office Action" issued on May 20, 2025, Japan.
New wound consultation attachment, application No. 112132092 application date: Aug, 25, 2023.
Taiwan Intellectual Property Office Office action Oct. 23, 2023.

* cited by examiner

METHOD FOR PREPARING CONDUCTOR MATERIAL WITH LARGE SURFACE AREA AND THE STRUCTURE THEREOF

BACKGROUND OF THE INVENTION

Large surface area materials are materials with extremely large specific surface area, and their industry development is growing rapidly. The advantage of this type of material lies in its huge surface-area-to-volume ratio, which makes it widely used in many fields.

The industrial application of large surface area materials involves many fields, such as catalysts, adsorbents, and energy storage.

Large surface area materials often serve as efficient catalysts. Due to their huge surface area, they can provide more active surfaces, thereby increasing reaction rates and efficiency. Such materials have important applications in the fields of chemical synthesis, environmental protection, and energy conversion, such as automobile exhaust gas purification, chemical reaction catalysis, and fuel cells.

Large surface area materials can have a large number of microscopic pores, which often have excellent performance in adsorption and separation processes. This makes large surface area materials widely used in gas and liquid separation, water treatment, waste treatment, and other fields. For example, activated carbon is a common large surface area adsorbent material that can be used to remove organic matter and heavy metal ions from water.

Large surface area materials play an important role in the field of energy storage. For example, electrode materials in supercapacitors and lithium-ion batteries often use porous materials with large surface area to increase the charge transfer rate and capacitance. Among them, supercapacitor technology is the one that have attracted much attention.

The appearance and structure of capacitors vary depending on their type, and there are many commonly used capacitors on the market. Most capacitors consist of at least two metal plates or metallic conductor surfaces separated by a layer of insulating material. The conductor can be a metal foil, film, sintered metal beads, or electrolyte. Non-conductive insulating materials can improve the energy storage capacity of capacitors. Common insulating materials include glass, ceramics, plastic films, paper, mica, and metal oxides. Capacitors play an important role in many electronic circuit and energy storage applications.

Capacitors are widely used in electronic circuits. In terms of energy storage applications, they can be used as a substitute for batteries in some application fields. When high power output is required, capacitors are more suitable than batteries.

All in all, capacitors, as an important electronic component and power energy storage component, have the function of storing electrical energy and adjusting circuit characteristics. Different types of capacitors play key roles in different applications, from electronic equipment to power systems, all of which are indispensable in the application of capacitors. With the continuous development of science and technology, capacitors will continue to play an important role in promoting progress and innovation in the electronic field.

High dielectric constant ferroelectric materials in the temperature range of 25 to 200° C. include barium titanate, lead magnesium niobate, and lead zirconate titanate. However, lead-containing materials are easily volatile at high temperatures, react easily with electrodes, and are inherently toxic, which restrict their development. Therefore, barium titanate ceramic has become one of the most widely used dielectric materials for electronic ceramic capacitors nowadays.

With the development of the industry, there is an increasing need for more efficient large surface area materials in the fields of catalysts, adsorbents, and energy storage. Especially in the field of energy storage, the high-value electric energy storage market and the power electronic equipment market are gradually moving toward miniaturization and high performance. Dielectric materials are developing toward the direction of high energy storage density, high charge and discharge efficiency, easy processing and molding, and stable performance. Therefore, the industry needs a method for preparing conductor materials with large surface area to produce conductive materials with high specific surface area for applications in the fields of catalysts, adsorbents and energy storage as described above.

To solve the above problems according to the prior art, the present invention provides a method for preparing conductor material with large surface area and the structure thereof, which comprises steps of: forming a block layer on the outer surface of a support precursor; rolling to crack a portion of the outer surface of the block layer for exposing a portion of the outer surface of the support precursor; and adding a conductor material to connect electrically to a portion of the support precursor for producing a conductor material with large surface area.

SUMMARY OF THE INVENTION

An objective of the present invention is to provide a method for preparing conductor material with large surface area and the structure thereof, which comprises steps of: forming a block layer on the outer surface of a support precursor; rolling to crack a portion of the outer surface of the block layer for exposing a portion of the outer surface of the support precursor; and adding a conductor material to connect electrically to a portion of the support precursor for producing a conductor material with large surface area.

To achieve the above objective and efficacy, the present invention provides a method for preparing conductor material with large surface area, which comprises steps of: forming a block layer on the outer surface of a support precursor for producing a mixed precursor; rolling the mixed precursor or using other forceful blending methods to crack a portion of the outer surface of the block layer for producing a plurality of crack-gaps and exposing a portion of the outer surface of the support precursor from the plurality of crack-gaps; and adding a conductor material to the mixed precursor so that the conductor material contacts and is connected electrically to the support precursor via the plurality of crack-gaps for producing a conductor material with large surface area. By using this method, a conductor material with large surface area can be manufactured.

To achieve the above objective and efficacy, the present invention provides a structure of conductor material with large surface area, which comprises a substrate and a first large-surface-area conductive slurry layer. The first large-surface-area conductive slurry layer includes a first support precursor, a first block layer, and a plurality of particles. The first block layer envelops the first support precursor. The first block layer includes a plurality of first crack-gaps. The plurality of first particles are disposed at the plurality of first crack-gaps correspondingly. By using this structure, a conductor material with large surface area can be provided.

According to an embodiment of the present invention, in the step of forming a block layer on the outer surface of a support precursor for producing a mixed precursor, the support precursor is added into a titanium tetrachloride solution for forming the block layer on the outer surface of the support precursor and producing the mixed precursor.

According to an embodiment of the present invention, in the step of forming a block layer on the outer surface of a support precursor for producing a mixed precursor, the mixed precursor is added into a barium acetate solution so that the barium acetate in the barium acetate solution reacts with the titanium oxide in the block layer on the outer surface to form the layer of barium titanate.

According to an embodiment of the present invention, in the step of adding a conductor material to the mixed precursor so that the conductor material contacts and is connected electrically to the support precursor via the plurality of crack-gaps for producing a conductor material with large surface area, the conductor material includes a polyvinyl butyral solution, a conductive gel, and barium titanate particles. While rolling, the block layer is cracked for producing the plurality of crack-gaps. Then the conductive gel and the barium titanate particles contact and are connected electrically to the support precursor via the plurality of crack-gaps for producing a conductor material with large surface area.

According to an embodiment of the present invention, after the step of adding a conductor material to the mixed precursor so that the conductor material contacts and is connected electrically to the support precursor via the plurality of crack-gaps for producing a conductor material with large surface area, the method further comprises steps of coating the conductor material with large surface area on the top and bottom sides of a substrate and heating to a sintering temperature; and forming a capacitor.

According to an embodiment of the present invention, the support precursor includes a carbon nanotube (CNT) or a nanometer metal fiber.

According to an embodiment of the present invention, the polyvinyl butyral solution includes polyvinyl butyral (PVB), toluene ($C_7H_8$), and ethanol ($CH_3CH_2OH$) acting as adhesive or solvent.

According to an embodiment of the present invention, in the step of forming a block layer on the outer surface of a support precursor for producing a mixed precursor, the hydrothermal synthesis, electroless plating, electroplating and physical vapor deposition (PVD), and chemical vapor deposition (CVD) are adopted by using anyone or the combination of above methods for forming the block layer on the outer surface of the support precursor.

According to an embodiment of the present invention, the sintering temperature is between 1000° C. and 1350° C.

According to an embodiment of the present invention, the structure further comprises a second large-surface-area conductive slurry layer disposed below the substrate. The second large-surface-area conductive slurry layer includes a second support precursor, a second block layer, and a plurality of second particles. The second block layer envelops the second support precursor. The second block layer includes a plurality of second crack-gaps. The plurality of second particles are disposed at the plurality of second crack-gaps correspondingly.

According to an embodiment of the present invention, the first support precursor includes a carbon nanotube (CNT) or a nanometer metal fiber.

According to an embodiment of the present invention, the first block layer and the second block layer are barium titanate.

According to an embodiment of the present invention, the plurality of first particles and the plurality of second particles are metal particles.

DETAILED DESCRIPTION OF THE INVENTION

In order to make the structure and characteristics as well as the effectiveness of the present invention to be further understood and recognized, the detailed description of the present invention is provided as follows along with embodiments.

To solve the above problem according to the prior art, the present invention provides a method for preparing conductor material with large surface area and the structure thereof, which comprises steps of: forming a block layer on the outer surface of a support precursor; rolling to crack a portion of the outer surface of the block layer as to form the crack-gaps for exposing a portion of the outer surface of the support precursor; and adding a conductor material to connect electrically to a portion of the support precursor for producing a conductor material with large surface area. Then the need for materials with high specific surface area can be met for applications in the industry.

Figure 1:
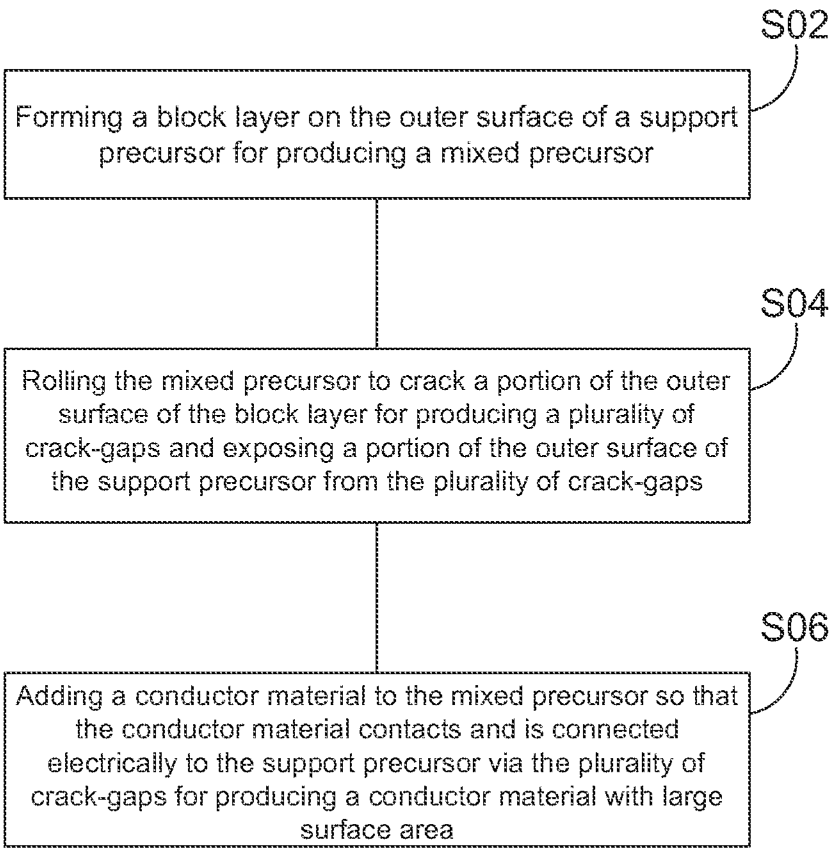
FIG. 1 shows a flowchart of material fabrication according to an embodiment of the present invention.

Please refer to FIG. 1, which shows a flowchart of material fabrication according to an embodiment of the present invention. As shown in the figure, the present embodiment provides a method for preparing conductor material with large surface area, which comprises steps of:

Step S02: Forming a block layer on the outer surface of a support precursor for producing a mixed precursor;

Step S04: Rolling the mixed precursor to crack a portion of the outer surface of the block layer for producing a plurality of crack-gaps and exposing a portion of the outer surface of the support precursor from the plurality of crack-gaps; and Step S06: Adding a conductor material to the mixed precursor so that the conductor material contacts and is connected electrically to the support precursor via the plurality of crack-gaps for producing a conductor material with large surface area.

Figure 2A:
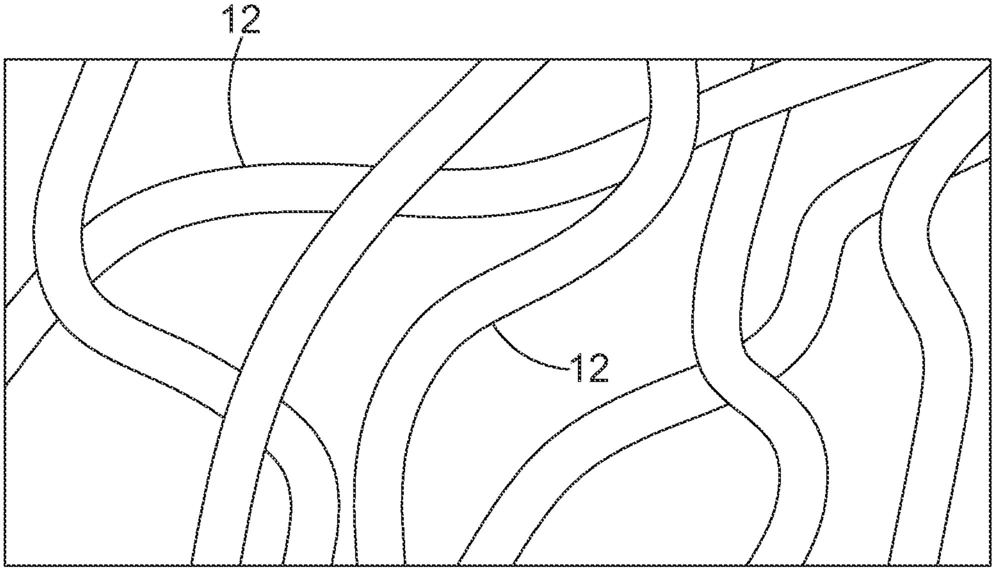
FIG. 2A to FIG. 2D show schematic diagrams of the material structure according to an embodiment of the present invention.
Figure 2B:
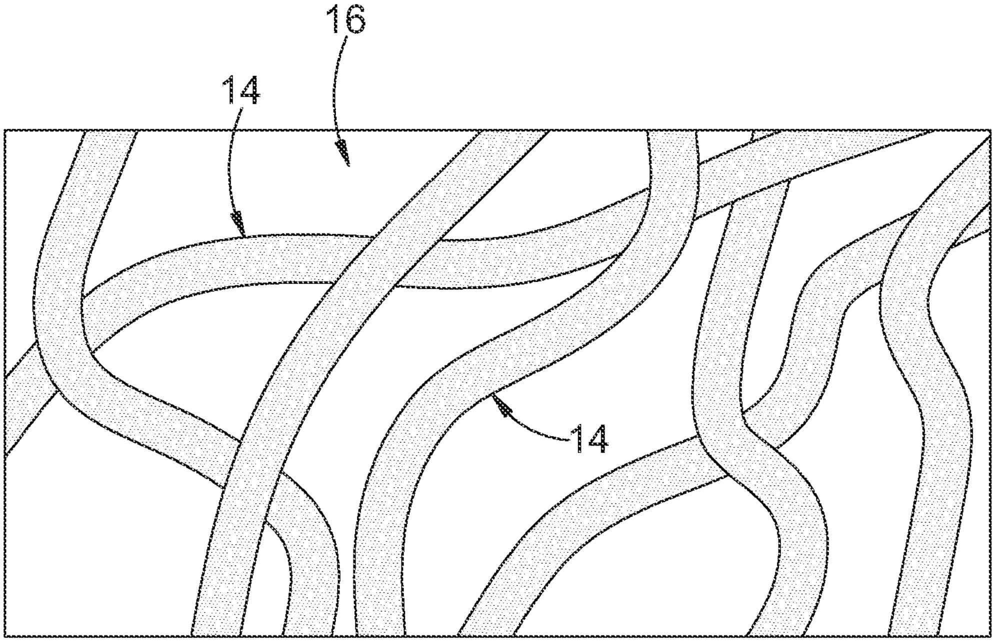
Figure 2C:
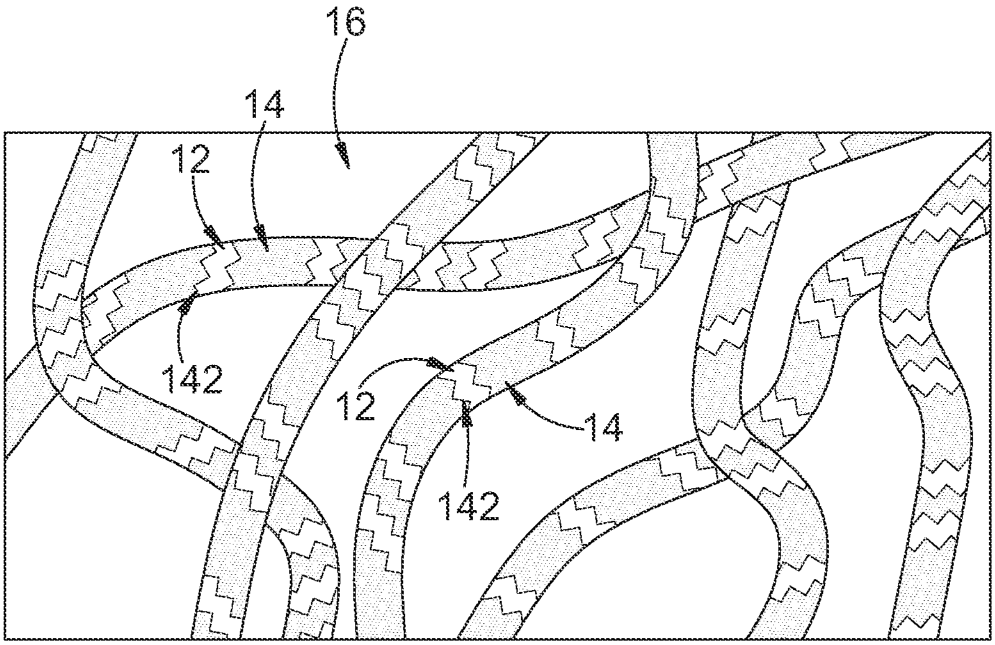

Please refer to FIG. 1 again and to FIG. 2A to FIG. 2D, which show schematic diagrams of the material structure according to an embodiment of the present invention. As shown in FIGS. 2A to 2B, in the step S02 of the present embodiment, form a block layer 14 on the outer surface of a support precursor 12. In other words, the block layer 14 envelops the outer surface of the support precursor 12 for producing a mixed precursor 16. The block layer 14 can prevent the fibers in the support precursor 12 from twining, collapsing, or mutual binding, which can result in reduction of the surface area of the support precursor 12.

According to an embodiment, the support precursor 12 includes a carbon nanotube (CNT) or a nanometer metal fiber. The metal in the nanometer metal fiber can be copper, silver, or nickel. Nonetheless, the present invention is not limited to the embodiment.

According to an embodiment, the hydrothermal synthesis, electroless plating, electroplating and physical vapor deposition (PVD), and chemical vapor deposition (CVD) can be adopted by using anyone or the combination of any above methods for forming the block layer 14 on the outer surface of the support precursor 12. Nonetheless, the present invention is not limited to the embodiment.

Please refer to FIG. 1 and FIG. 2A to FIG. 2D again. As shown in the figures, in the step S04 of the present embodiment, after forming the mixed precursor 16 using the previous steps, roll the mixed precursor 16 for applying force to it. Consequently, the support precursor 12 in the mixed precursor 16 and the block layer 14 will be bent and deformed, which cracks the outer surface of the block layer 14 and produces a plurality of crack-gaps 142 on the outer surface of a portion of the block layer 14 and thus exposing a portion of the outer surface of the support precursor 12 at the plurality of crack-gaps 142.

According to the present embodiment, the plurality of crack-gaps 142 are formed and exposed on the support precursor 12 by deforming and restoring the block layer 14.

Please refer to FIG. 1 and FIG. 2A to FIG. 2D again. As shown in the figures, in the step S06 of the present embodiment, add a conductor material 18 to the mixed precursor 16 so that the conductor material 18 contacts and is connected electrically to the support precursor 11 via the plurality of crack-gaps 142. Because the conductor material 18 is connected electrically to the support precursor 12 inside the block layer 14, by increasing the surface area of the support precursor 12 contacting the outer side, a conductor material with large surface area can be produced.

According to the present embodiment, the conductor material 18 is metal conductive gel. The conductor material 18 is further interconnected so that the fibers of the support precursor 12 are mutually connected and thus giving high specific surface area of the conductor material with large surface area.

The method for preparing conductor material with large surface area according to the present embodiment can produce conductive materials with high specific surface area, which is applicable to different industries such as catalyst materials or super capacitors.

Figure 3:
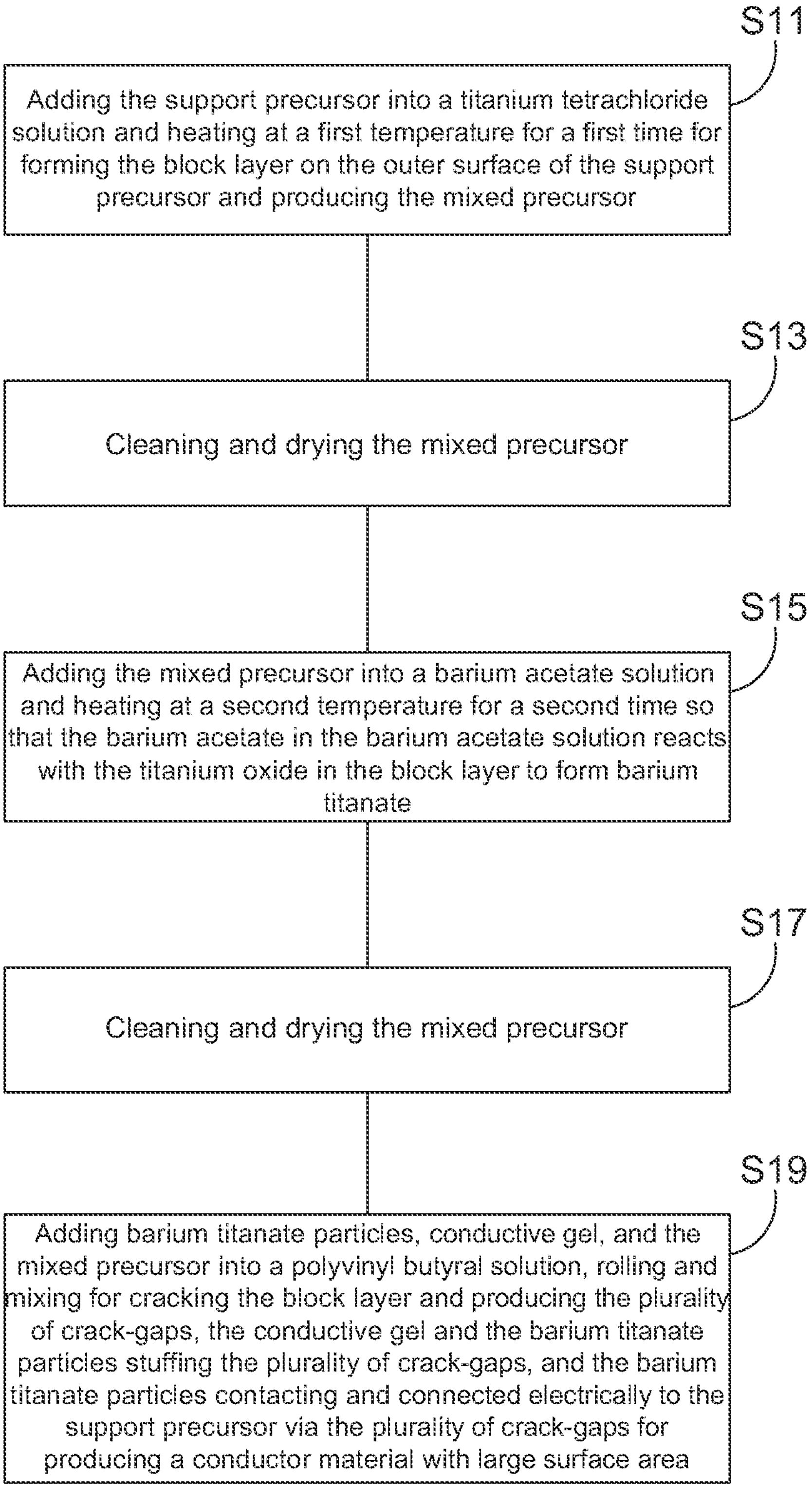
FIG. 3 shows a flowchart of manufacturing capacitor material according to an embodiment of the present invention.

Please refer to FIG. 3, which shows a flowchart of manufacturing capacitor material according to an embodiment of the present invention. As shown in the figure, the present embodiment is based on the previous one. The present embodiment is used to the method for preparing the material for capacitor, which comprises steps of:

Step S11: Adding the support precursor into a titanium tetrachloride solution and heating at a first temperature for a first time for forming the block layer on the outer surface of the support precursor and producing the mixed precursor;

Step S13: Cleaning and drying the mixed precursor;

Step S15: Adding the mixed precursor into a barium acetate solution and heating at a second temperature for a second time so that the barium acetate in the barium acetate solution reacts with the titanium oxide in the block layer to form barium titanate;

Step S17: Cleaning and drying the mixed precursor; and

Step S19: Adding barium titanate particles, conductive gel, and the mixed precursor into a polyvinyl butyral solution, rolling and mixing for cracking the block layer and producing the plurality of crack-gaps, the conductive gel and the barium titanate particles stuffing the plurality of crack-gaps, and the barium titanate particles contacting and connected electrically to the support precursor via the plurality of crack-gaps for producing a conductor material with large surface area.

Please refer to FIG. 3 again. As shown in the figure, in the step S11 of the present embodiment, after adding the support precursor into a titanium tetrachloride solution, the support precursor and the titanium tetrachloride solution are mixed and heated at a first temperature. After heating for a first time, the titanium tetrachloride solution reacts with oxygen to form titanium oxide on the outer surface of the support precursor and thus forming the block layer and producing the mixed precursor.

According to the present embodiment, a carbon nanotube (CNT) is adopted as the support precursor. The support precursor includes a plurality of carbon nanotubes. The plurality of carbon nanotubes, the acidic solution, and the titanium tetrachloride are mixed uniformly and heated to form a first mixture. The acidic solution softens and increases the surface activity of the carbon nanotubes so that titanium can attach to the surface of the carbon nanotubes.

According to an embodiment, the support precursor can be a nanometer metal fiber, which are formed by a plurality of nanometer metal filaments made by nanometer metals such as copper, silver, or nickel. Then the plurality of nanometer metal fibers, the acidic solution, and the titanium tetrachloride are mixed uniformly and heated to form a first mixture. The acidic solution increases the surface activity of the nanometer metals so that titanium can attach to the surface of the nanometer metal fibers.

According to an embodiment, the support precursor can be first rinsed by an acidic solution for removing the impurities on the outer surface of the support precursor. The acidic solution can be, but not limited to, nitric acid. According to the material of the support precursor, different acidic solution can be adopted.

According to the present embodiment, the titanium tetrachloride ($TiCl_4$) is used to produce the intermediate of titanium oxide and its compounds.

According to the present embodiment, the first temperature and the first time vary according to the material properties of the support precursor and the titanium tetrachloride solution. For example, for the embodiment of carbon nanotubes and titanium tetrachloride, the first temperature is between 80° C. and 100° C. and the first time is between 0.5 and 8 hours. For example, the mixture of the support precursor and the titanium tetrachloride solution is heated at 90° C. for 0.5~10 hours.

According to an embodiment, an ultrasonic vibrator is adopted for vibrating the mixture of the acidic solution, the support precursor, and the titanium tetrachloride for 1~2 hours for achieving uniform mixing.

Please refer again to FIG. 3. As shown in the figure, in the step S13 of the present embodiment, the mixed precursor is further rinsed by deionized water and ethanol so that the pH value is neutral. For example, the hydrochloric acid formed during the reaction of producing titanium oxide from titanium tetrachloride. Afterwards, the mixed precursor is dried by using an oven.

In the above embodiment of carbon nanotubes and titanium tetrachloride, the mixed precursor is the precursor of titanium oxide-carbon nanotubes ($TiO_2$—CNT).

According to the present embodiment, the mixed precursor is dried at 50° C.~70° C.

Please refer again to FIG. 3. As shown in the figure, in the step S15 of the present embodiment, add the mixed precursor into a barium acetate solution and heat at a second temperature for a second time so that the barium acetate in the barium acetate solution reacts with the titanium oxide in the block layer to form barium titanate.

According to the present embodiment, the second temperature and the second time vary according to the material properties of the barium acetate solution and the mixed precursor. For example, for the embodiment of the barium acetate solution and the mixed precursor, the second temperature is between 150° C. and 170° C. and the second time is between 0.5 and 10 hours. For example, the mixture of the barium acetate solution and the mixed precursor is heated at 160° C. for 0.5~10 hours to ensure complete reaction of the mixed precursor and the barium acetate solution.

According to an embodiment, an ultrasonic vibrator is adopted for vibrating the mixture of the barium acetate solution and the mixed precursor for 1~2 hours for achieving uniform mixing.

According to an embodiment, the mixed precursor is further rinsed by deionized water and ethanol so that the pH value is neutral.

Please refer again to FIG. 3. As shown in the figure, in the step S17 of the present embodiment, an oven is used to dry the mixed precursor.

In the above embodiment of barium acetate solution and the mixed precursor, the reaction of the barium acetate solution and the mixed precursor produces barium titanate-carbon nanotube ($BaTiO_3$—CNT) precursor.

According to the present embodiment, the mixed precursor is dried at 50° C.~70° C.

Figure 2D:
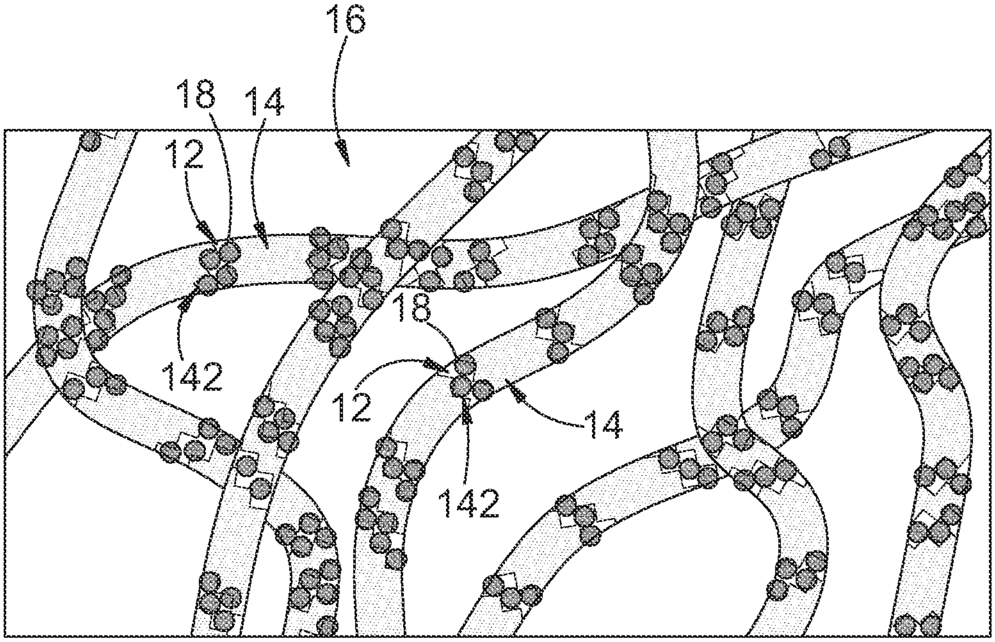

Please refer again to FIG. 3. As shown in the figure, in the step S19 of the present embodiment, the conductor material includes a polyvinyl butyral solution, a conductive gel, and barium titanate particles. Add barium titanate particles, conductive gel, and the mixed precursor into a polyvinyl butyral solution. Roll and mix for slightly cracking the block layer and producing the plurality of crack-gaps. The particles of the conductive gel stuff the plurality of crack-gaps of the block layer of the mixed precursor, as shown in FIG. 2D. Thereby, the conductive fibers (in the present embodiment, the carbon nanotubes) contact and are connected electrically to the outer surface of the support precursor via the plurality of crack-gaps for producing the conductor material with large surface area.

According to the present embodiment, the polyvinyl butyral solution includes polyvinyl butyral (PVB), toluene ($C_7H_8$), and ethanol ($CH_3CH_2OH$). $C_7H_8$ and $CH_3CH_2OH$ form a solution with a volume ratio 3:2. Then PVB is added into the solution to form the polyvinyl butyral solution.

Figure 4:
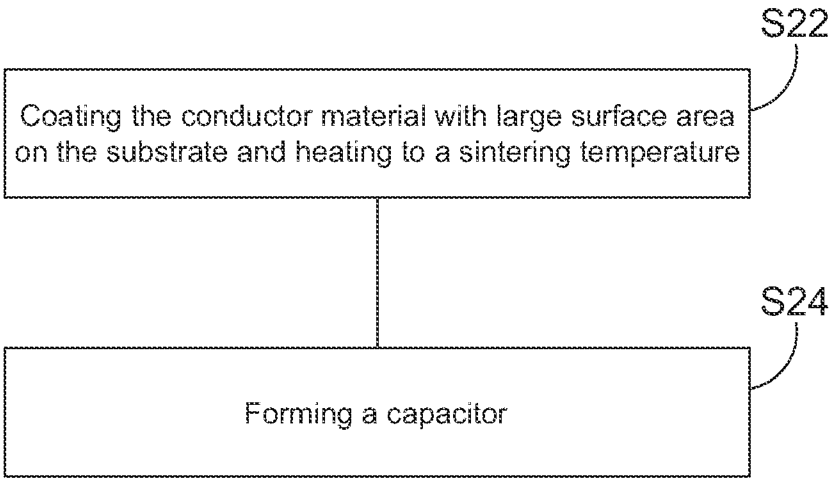
FIG. 4 shows a flowchart of application according to an embodiment of the present invention.

Please refer to FIG. 4, which shows a flowchart of application according to an embodiment of the present invention. As shown in the figure, after the step of adding a conductor material into the mixed precursor, and rolling and mixing for making the conductor material contact and be connected electrically to the support precursor via the plurality of crack-gaps for producing a conductor material with large surface area, the method further comprises steps of:

Step S22: Coating the conductor material with large surface area on the substrate and heating to a sintering temperature;

Step S24: Forming a capacitor.

Please refer again to FIG. 4. As shown in figure, in the step S22 of the present embodiment, the conductor material with large surface area is coated on a substrate 10.

Please refer again to FIG. 4. As shown in figure, in the step S24 of the present embodiment, the conductor material with large surface area is coated below the substrate 10. After heating to the sintering temperature, a capacitor will be formed.

Figure 5:
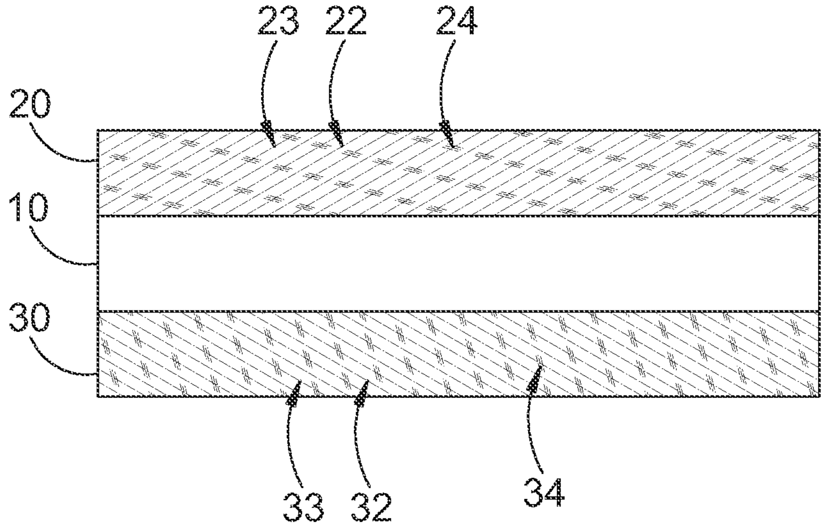
FIG. 5 shows a schematic diagram of the capacitor structure according to an embodiment of the present invention.

Please refer to FIG. 5, which shows a schematic diagram of the capacitor structure according to an embodiment of the present invention. As shown in the figure, the present embodiment discloses application to preparing capacitors. According to the present embodiment, a viscometer is used to test the mixed precursor. When suitable viscosity is reached, the mixed precursor is then rolled and mixed for slightly destroying the block layer on the outer side of the support precursor to generate the plurality of crack-gaps.

According to an embodiment, a three roll mill (triple roll mill) is adopted to roll and mix the capacitor slurry.

Please refer again to FIG. 5. As shown in the figure, according to the present embodiment, the capacitor slurry is coated on the top and bottom sides of the substrate 10. The capacitor slurry is coated on the top of the substrate 10 to form a first large-surface-area conductive slurry layer 20. The capacitor slurry is coated on the bottom of the substrate 10 to form a second large-surface-area conductive slurry layer 30. The substrate 10, the first large-surface-area conductive slurry layer 20, and the second large-surface-area conductive slurry layer 30 for a capacitor precursor. After sintering at high temperatures, a capacitor product will be manufactured.

According to the present embodiment, the substrate 10 is a barium titanate or metal oxide ceramic substrate, for example, a substrate containing barium or other dielectric materials, used for binding with the large-surface-area conductive slurry.

According to the present embodiment, the first large-surface-area conductive slurry layer 20 includes a plurality of first support precursors 22 and a plurality of first particles 24. According to an embodiment, the plurality of first support precursors 22 are carbon nanotubes (CNT). The plurality of first support precursors 22 envelops a first block layer 23, for example, barium titanate ($BaTiO_3$). The plurality of first particles 24 are the metal particles of the conductive slurry. Nonetheless, the present invention is not limited to the embodiment.

According to the present embodiment, the second large-surface-area conductive slurry layer 30 includes a plurality of second support precursors 32 and a plurality of second particles 34. According to an embodiment, the plurality of second support precursors 32 are carbon nanotubes (CNT). The plurality of second support precursors 32 envelops a second block layer 33, for example, barium titanate ($BaTiO_3$). The plurality of second particles 34 are the metal particles of the conductive slurry. Nonetheless, the present invention is not limited to the embodiment.

Please refer again to FIG. 5 again. As shown in the figure, according to the present embodiment, heat the intermediate product to a third temperature, which is the sintering temperature of the second mixture and the substrate 10.

In the above embodiment of $BaTiO_3$—CNT, the third temperature is between 1000° C. and 1350° C. The intermediate product is first heated at 240° C.~260° C. for 2~2.5 hours. Afterward, it is further heated at 1000° C.~1350° C. for 2~2.5 hours.

An objective of the present invention is to provide a method for preparing conductor material with large surface area and the structure thereof, which comprises steps of: forming a block layer on the outer surface of a support precursor; rolling to crack a portion of the outer surface of the block layer for exposing a portion of the outer surface of the support precursor; and adding a conductor material to connect electrically to a portion of the support precursor for producing a conductor material with large surface area.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A method for preparing conductor material with large surface area, comprising steps of:

forming a block layer on the outer surface of a support precursor for producing a mixed precursor;

rolling the mixed precursor to crack a portion of the outer surface of said block layer for producing a plurality of crack-gaps and exposing a portion of the outer surface of said support precursor from the plurality of crack-gaps; and adding a conductor material to said mixed precursor so that said conductor material contacts and is connected electrically to said support precursor via said plurality of crack-gaps for producing a conductor material with large surface area.

2. The method for preparing conductor material with large surface area of claim 1, where in said step of forming a block layer on the outer surface of a support precursor for producing a mixed precursor, said support precursor is added into a titanium tetrachloride solution for forming said block layer on the outer surface of said support precursor and producing said mixed precursor.

3. The method for preparing conductor material with large surface area of claim 2, where in said step of forming a block layer on the outer surface of a support precursor for producing a mixed precursor, said mixed precursor is added into a barium acetate solution so that the barium acetate in said barium acetate solution reacts with the titanium oxide in said block layer to form barium titanate.

4. The method for preparing conductor material with large surface area of claim 3, where in said step of adding a conductor material to said mixed precursor so that said conductor material contacts and is connected electrically to said support precursor via said plurality of crack-gaps for producing a conductor material with large surface area, said conductor material includes a polyvinyl butyral solution, a conductive gel, and barium titanate particles; while rolling, said block layer is cracked for producing said plurality of crack-gaps; then said conductive gel and said barium titanate particles contact and are connected electrically to said support precursor via said plurality of crack-gaps for producing said conductor material with large surface area.

5. The method for preparing conductor material with large surface area of claim 4, wherein said support precursor includes a carbon nanotube (CNT) or a nanometer metal fiber.

6. The method for preparing conductor material with large surface area of claim 4, wherein said polyvinyl butyral solution includes polyvinyl butyral (PVB), toluene ($C_7H_3$), and ethanol ($CH_3CH_2OH$) acting as adhesive or solvent.

7. The method for preparing conductor material with large surface area of claim 1, after said step of adding a conductor material to said mixed precursor so that said conductor material contacts and is connected electrically to said support precursor via said plurality of crack-gaps for producing a conductor material with large surface area, further comprising steps of:

coating said conductor material with large surface area on the top and bottom sides of said substrate and heating to a sintering temperature; and forming a capacitor.

8. The method for preparing conductor material with large surface area of claim 7, wherein said sintering temperature is between 1000° C. and 1350° C.

9. The method for preparing conductor material with large surface area of claim 1, wherein said support precursor includes a carbon nanotube (CNT) or a nanometer metal fiber.

10. The method for preparing conductor material with large surface area of claim 1, where in said step of forming a block layer on the outer surface of a support precursor for producing a mixed precursor, the hydrothermal synthesis, electroless plating, electroplating and physical vapor deposition (PVD), and chemical vapor deposition (CVD) are adopted by using anyone or the combination of any above methods for forming said block layer on the outer surface of said support precursor.

11. A structure of conductor material with large surface area, comprising:

a substrate; and a first large-surface-area conductive slurry layer, disposed on said substrate, including a first support precursor, a first block layer, and a plurality of particles, said first block layer enveloping said first support precursor, said first block layer including a plurality of first crack-gaps, and said plurality of first particles disposed at said plurality of first crack-gaps correspondingly.

12. The structure of conductor material with large surface area of claim 11, and further comprising a second large-surface-area conductive slurry layer, disposed below said substrate, including a second support precursor, a second block layer, and a plurality of second particles, said second block layer enveloping said second support precursor, said second block layer including a plurality of second crack-gaps, and said plurality of second particles are disposed at said plurality of second crack-gaps correspondingly.

13. The structure of conductor material with large surface area of claim 12, wherein said second support precursor includes a carbon nanotube (CNT) or a nanometer metal fiber.

14. The structure of conductor material with large surface area of claim 12, wherein said second block layer are barium titanate.

15. The structure of conductor material with large surface area of claim 12, wherein said plurality of second particles are metal particles.

16. The structure of conductor material with large surface area of claim 11, wherein said first support precursor includes a carbon nanotube (CNT) or a nanometer metal fiber.

17. The structure of conductor material with large surface area of claim 11, wherein said first block layer are barium titanate.

18. The structure of conductor material with large surface area of claim 11, wherein said plurality of first particles are metal particles.

* * * * *